(12) United States Patent
Carrie

(10) Patent No.: US 7,266,674 B2
(45) Date of Patent: Sep. 4, 2007

(54) PROGRAMMABLE DELAYED DISPATCH IN A MULTI-THREADED PIPELINE

(75) Inventor: Susan E. Carrie, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 85 days.

(21) Appl. No.: 11/065,646

(22) Filed: Feb. 24, 2005

(65) Prior Publication Data

US 2006/0190703 A1 Aug. 24, 2006

(51) Int. Cl.
*G06F 9/38* (2006.01)
(52) U.S. Cl. .................. 712/219; 712/213; 712/215
(58) Field of Classification Search ............. 712/213, 712/215, 219
See application file for complete search history.

(56) References Cited

U.S. PATENT DOCUMENTS 5,337,415 A * 8/1994 DeLano et al. ............ 712/213

OTHER PUBLICATIONS

Daniel C. McCrackin, "Practical Delay Enforced Multistream (DEMUS) Control of Deeply Pipelined Processors", IEEE Transactions on Computers, vol. 44, iss. 3, Mar. 1995, pp. 458-462.*

* cited by examiner

*Primary Examiner*—William M. Treat
(74) *Attorney, Agent, or Firm*—Vierra Magen Marcus & DeNiro LLP

(57) ABSTRACT

Detecting a stall condition associated with processor instructions within one or more threads and generating a no-dispatch condition. The stall condition can be detected by hardware and/or software before and/or during processor instruction execution. The no-dispatch condition can be associated with a number of processing cycles and an instruction from a particular thread. As a result of generating the no-dispatch condition, processor instructions from other threads may be dispatched into the execution slot of an available execution pipeline. After a period of time, the instruction associated with the stall can be fetched and executed.

19 Claims, 13 Drawing Sheets

PROGRAMMABLE DELAYED DISPATCH IN A MULTI-THREADED PIPELINE

BACKGROUND OF THE INVENTION

1. Field of the Invention

The present invention is directed to processing instructions in one or more threads of execution.

2. Description of the Related Art

Processors execute processor instructions using execution pipelines, dispatch units, instruction decode units and other units. Processor instructions are retrieved from a memory device by an instruction fetch unit. A dispatch unit fetches one or more processor instructions from one or more threads and dispatches the instruction(s) to one or more execution pipelines having an open execution slot. An execution pipeline receives and executes one or more instructions. Once another execution slot is available in one of the execution pipelines, additional processor instructions are fetched for a thread and dispatched to the appropriate execution pipeline.

Once dispatched, each processor instruction is processed by one or more execution pipelines until the instruction stalls, is flushed or completes. In some systems, when an instruction stalls within an execution pipeline, all instructions waiting to be processed in that execution pipeline are delayed. Thus, although only one thread is waiting for the result of an instruction that caused the stall, other threads having instructions within the stalled execution pipeline are effectively stalled as well. Additionally, in some systems, when one execution pipeline is stalled, other execution pipelines stall as well.

Some stall conditions can be detected when the processor instructions are compiled. For example, an execution pipeline may require ten processing cycles, or clock cycles, to perform a multiply operation. A first instruction for thread A may request a multiply operation. The second instruction for thread A may use the result of the multiply operation. In this scenario, the second instruction will stall for nine processing cycles until the result of the first instruction is available.

The stall condition discussed above can be detected at compile time. If detected, a compiler may avoid the stall by scheduling instructions collectively requiring at least nine processing cycles after the first instruction. If other instructions cannot be scheduled after the first instruction, the compiler can insert up to nine no operation instructions (nops) between the first two instructions. The nops are dispatched and executed by an execution pipeline similar to any other instruction. The disadvantages to using nops are that the instruction image becomes larger and requires more memory and the nops take valuable execution slots in execution pipelines. Dispatching a nop for an execution slot delays execution of other processor instructions which could have been dispatched for the execution slot. This includes instructions which could have been dispatched for other threads. Additionally, stall conditions caused by processor instructions residing in different threads are not detected by compiler programs and instruction processing systems.

Thus, there is a need to better handle potential stall conditions.

SUMMARY OF THE INVENTION

The technology herein, roughly described, pertains to detecting stall conditions in processor instructions and generating a no-dispatch condition and preventing the dispatch of specified instructions based on the no-dispatch condition. The stall condition can be detected by hardware and/or software before and/or during processor instruction execution. Once a stall condition is detected, a no-dispatch condition is generated. The no-dispatch condition may be embedded in the instruction image prior to execution or generated during instruction execution. In one embodiment, the no-dispatch condition indicates that the dispatching of instructions for one or more threads should be delayed. The no-dispatch condition can be associated with a number of processing cycles and with one instruction or with a combination of instructions. As a result of generating the no-dispatch condition, processor instructions from other threads may be dispatched into the execution slot of an available execution pipeline.

In one embodiment, a process for processing potential stalls in a set of instructions includes instruction processing hardware or software detecting a stall condition associated with a set of accessed processor instructions. After the stall condition is detected, a no-dispatch condition is generated.

In one embodiment, a system is disclosed for processing a no-dispatch condition in an execution pipeline. The system includes a storage device and one or more execution pipelines. The storage device has computer-readable instructions stored thereon. At least one of the computer-readable instructions includes no-dispatch information. The system includes one or more execution pipelines which, in communication with the storage device, are configured to execute the computer-readable instructions.

DETAILED DESCRIPTION

In one embodiment, a system and method is disclosed for detecting a stall condition associated with processor instructions. The stall condition can be detected by hardware and/or software before and/or during processor instruction execution. In one embodiment, software can be used to detect stall conditions at compile time and hardware can detect stall conditions during or just prior to instruction execution.

Once a stall condition is detected, a no-dispatch condition is generated. The no-dispatch condition indicates that one or more instructions associated with a thread should not be dispatched for a specified latency period. The specified latency period may be the time period, for example the number of processing cycles, required before a resource being competed for or being produced is available to a later stall causing instruction. As a result of generating the no-dispatch condition, processor instructions from other threads may be dispatched into the execution slot of an available execution pipeline. After the specified latency period has transpired, the instruction associated with the stall can be dispatched.

In an embodiment wherein the no-dispatch condition is generated by software, the software configures a no-dispatch instruction with no-dispatch information. The no-dispatch instruction may contain only no-dispatch information or comprise another type of instruction with the no-dispatch information added. Once no-dispatch instructions are configured and included in a code image, an instruction processing system can recognize the no-dispatch instruction and dispatch instructions from other threads into available execution slots. This provides for more efficient instruction processing. This is discussed in more detail below.

In an embodiment, the no-dispatch condition is generated by hardware within an instruction processing system. In this embodiment, instructions to be executed are first examined by the instruction processing system. When a stall condition is detected in the examined instructions, the instruction processing system generates no-dispatch information for a particular thread. Instructions from other threads can then be dispatched into available execution slots for a number of processing cycles associated with the no-dispatch information. This is discussed in more detail below.

Figure 1:
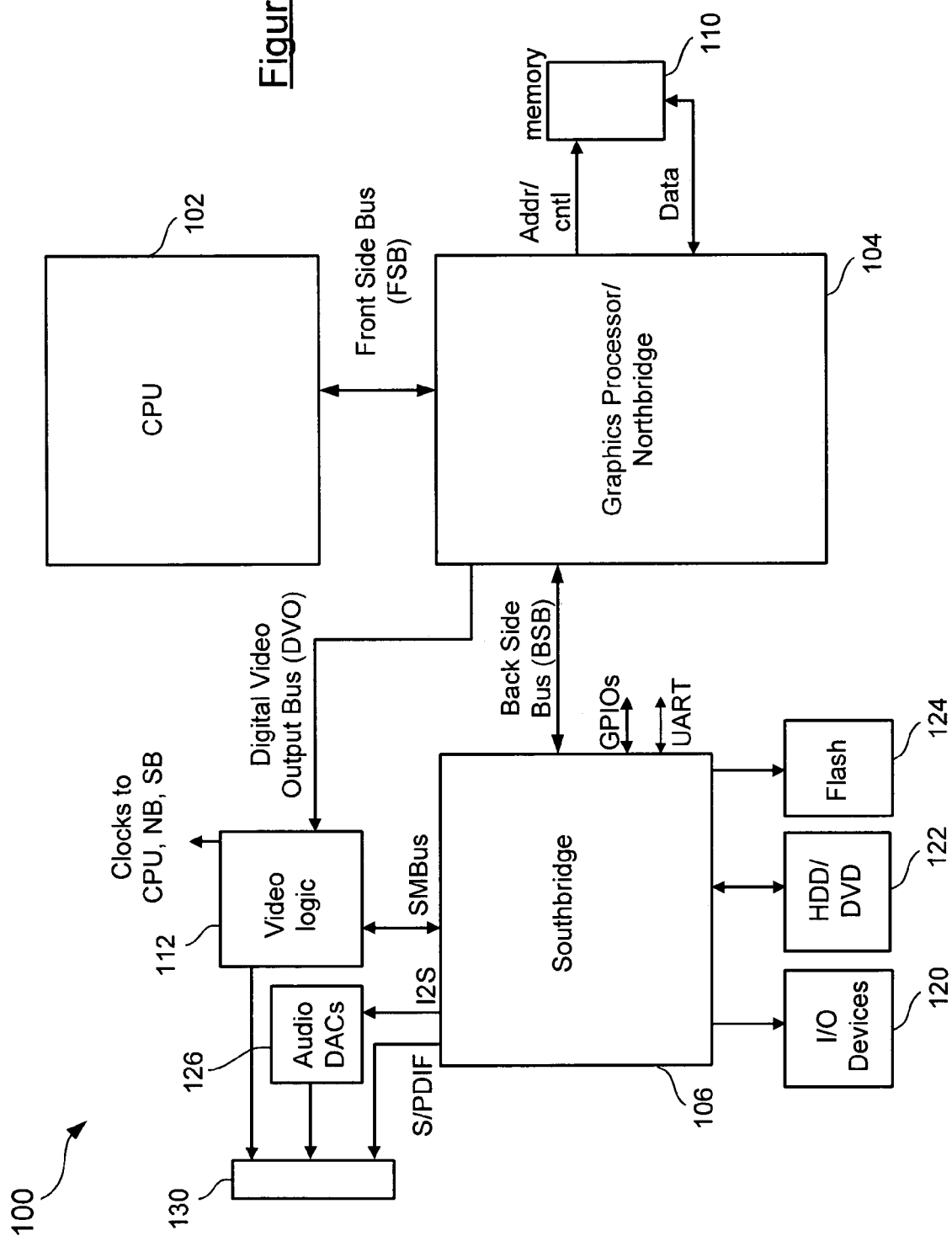
FIG. 1 illustrates one embodiment of a computing system suitable for use with the present invention.

FIG. 1 illustrates one embodiment of a computing device 100 in which the invention may be implemented. One example of such a computing device can be a game device for providing multimedia experiences and playing video games that include an audio and video. Audio and video data tends to be deterministic, streaming and digital until reaching a digital to analog interface. Within computing device 100, audio and video processing circuits process the data internally as digital data, but output the data on analog signals.

Computing device 100 includes central processing unit (CPU) 102, graphics processor/Northbridge 104, memory 110, video logic 112, audio digital-to-analog converters 126, Southbridge 106, input/output devices 120, HDD and DVD devices 122 and flash 124. Northbridge 104 communicates with memory 110 via address control lines (Addr/cntl) and data lines (Data). In one embodiment, northbridge 104 provides processing functions, memory functions, and serves as an intermediary between CPU 102 and Southbridge 106. Northbridge 104 communicates with Southbridge 106 via a Backside Bus (BSB). Southbridge 106 performs various I/O functions, signal processing and other functions. Southbridge 106 is in communication with I/O devices 120, hard disc drive and DVD drives 122, and flash memory 124. Northbridge 104 communicates with video logic 112 via a Digital Video Output Bus (DVO).

Northbridge 104 communicates with Southbridge 106 via a Backside Bus (BSB). Southbridge 106 performs various I/O functions, audio processing and testing functions. Southbridge 106 is in communication with I/O devices 120, hard disc drive and DVD drives 122, and flash memory 124. System 100 also includes video logic 112. Northbridge 104 communicates with video logic 112 via a Digital Video Output Bus (DVO). Video logic 112 also includes clock generation circuits which provide clocks to CPU 102, Northbridge 104 and Southbridge 106.

As discussed above, Southbridge 106 provides various audio processing. Southbridge communicates with digital to analog converters 126 via an I2S Bus. I2S is a standard digital audio chip-to-chip unidirectional interface. In its basic form, it consists of a sample clock (SCLK), a master clock (MCLK), a left/right indicator (LRSEL), and a serial data line. An interface 130 is included for connecting system 100 to components outside the system. Southbridge 106 is connected to interface 130 directly. In addition, digital analog converters 126 and video logic 112 are also connected to interface 430.

Figure 2A:
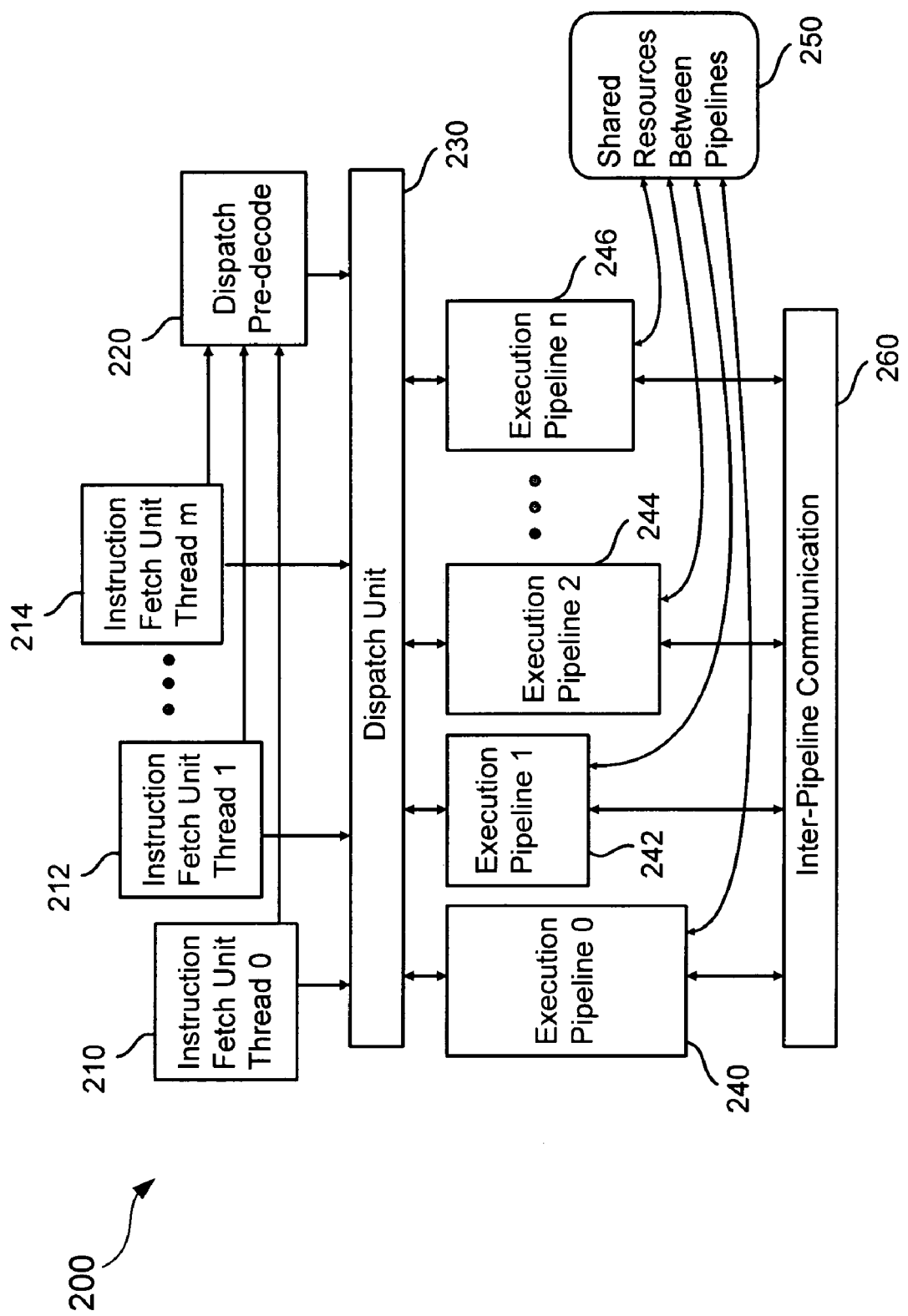
FIG. 2A illustrates one embodiment of an instruction processing system.

FIG. 2A illustrates one embodiment of an instruction processing system 200 for processing stall conditions and processing and generating no-dispatch conditions. System 200 can be implemented within CPU 102 of FIG. 1. System 200 can also be implemented within any CPU which processes instructions. System 200 includes instruction fetch units 210, 212 and 214, dispatch pre-decode unit 220, dispatch unit 230, execution pipelines 240, 242, 244 and 246, shared resource 250 and inter-pipeline communication 260. Although three instruction fetch units are depicted, more or less than three can be used. Instruction fetch units 210-214 provide instruction information for instructions associated with a particular thread. For example, instruction fetch unit (IFU) 210 can be associated with a thread 0, IFU 212 can be associated with thread 1, and IFU 214 can be associated with thread m. IFUs are discussed in more detail below with respect to FIG. 2B. The instruction information can include a pointer to the instruction, the instruction itself, or other information regarding an instruction. Instruction information is discussed in more detail below.

Dispatch pre-decode unit 220 can detect stall conditions and generate no-dispatch conditions during execution of processor instructions by instruction processing system 200. In one embodiment, dispatch pre-decode unit 220 receives and processes instruction information from each instruction fetch unit around the same time that the instruction information is received by dispatch unit 230. If dispatch pre-decode unit 220 detects a stall condition, dispatch pre-decode unit 220 sends no-dispatch information associated with the stall to dispatch unit 230. The no-dispatch information can be associated with one or more instruction fetch units or one or more threads. This is discussed in more detail below.

The dispatch unit 230 receives instruction information from the instruction fetch units, provides instruction information to the execution pipelines, and determines from which thread to retrieve instruction information. Dispatch unit 230 may also receive no-dispatch information directly from the dispatch pre-decode unit 220. The dispatch unit 230 can recognize no-dispatch information associated with a processor instruction received from an instruction fetch unit. In one embodiment, the no-dispatch information is encoded into the instruction or instruction information. Dispatch unit 230 is discussed in more detail below with respect to FIGS. 8A-B.

Execution pipelines 240-246 execute instructions dispatched to the particular pipeline by dispatch unit 230. In one embodiment, execution pipelines 240-244 can be different types of pipelines. For example, the execution pipelines may include an integer execution pipeline, a floating-point execution pipeline, and a branch pipeline. The integer execution pipeline may handle operations involving integer variables, such as add and subtract operations. The floating point execution pipeline may handle operations involving floating point variables, such as multiply operations. The branch pipeline may determine which execution pipeline has an available execution slot and provide this information to dispatch unit 230. Each of the execution pipelines can communicate and exchange information with each other through inter-pipeline communication 260.

Shared resource 250 includes one or more resources, such as a register file, that can be accessed or otherwise used by one or more execution pipelines. Inter-pipeline communication 260 represents lines of communication between execution pipelines 240-244. The communication between pipelines may include a request for the status of an operation, a request for the result of an operation, a request for the status of a pipeline or other information requests. More detail regarding the interaction between the components of system 200 is provided below.

Figure 2B:
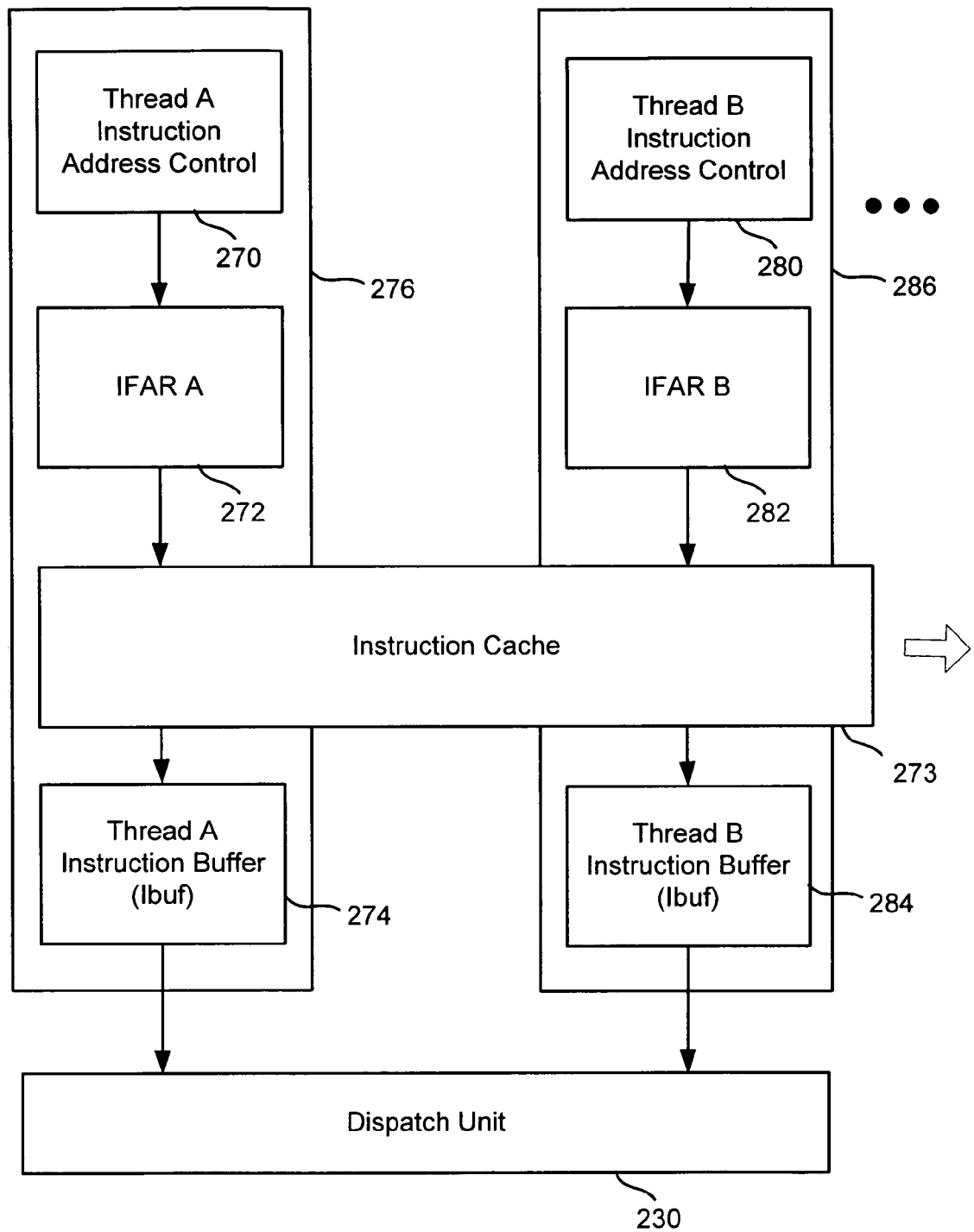
FIG. 2B illustrates one embodiment of instruction fetch units.

One embodiment of a plurality of IFUs, such as IFUs 210, 212 and 214 of FIG. 2A, is illustrated in more detail in system 265 of FIG. 2B. Though system 265 illustrates two IFUs, any number of IFUs can be used. System 265 includes instruction fetch units 276 and 286 for processing instructions from a thread A and thread B, respectively. Instruction fetch unit 276 includes thread A instruction address control 270, instruction fetch address register (IFAR) 272 and thread A instruction buffer (IBuf) 274. Instruction fetch unit 276 has access to load and receive instructions from instruction cache 273. Instruction fetch unit 286 includes thread B instruction address control 280, instruction fetch address register (IFAR) 282 and thread B instruction buffer (IBuf) 284. Instruction fetch unit 286 has access to load and receive instructions from instruction cache 273. In one embodiment, an instruction memory address associated with an instruction from a particular thread is loaded from the thread instruction address control to an IFAR associated with the thread. The instruction memory address is then loaded from the IFAR to the instruction cache. In some embodiments, one instruction cache can load instruction memory addresses for more than one IFAR, such as IFAR A 272 and IFAR B 282. In some embodiments one instruction cache can load multiple instructions for one IFAR. The Ibuf associated with a particular thread then loads instructions for that thread from the instruction cache. Thus, Ibuf 274 loads instructions for thread A instruction address control 270. Instruction information is then loaded from an Ibuf by dispatch unit 230 and/or dispatch pre-decode 220. Instruction information from each IFU is provided to dispatch unit 230. Dispatch unit 230 is discussed in more detail below with respect to FIGS. 8A-B.

Figure 3:
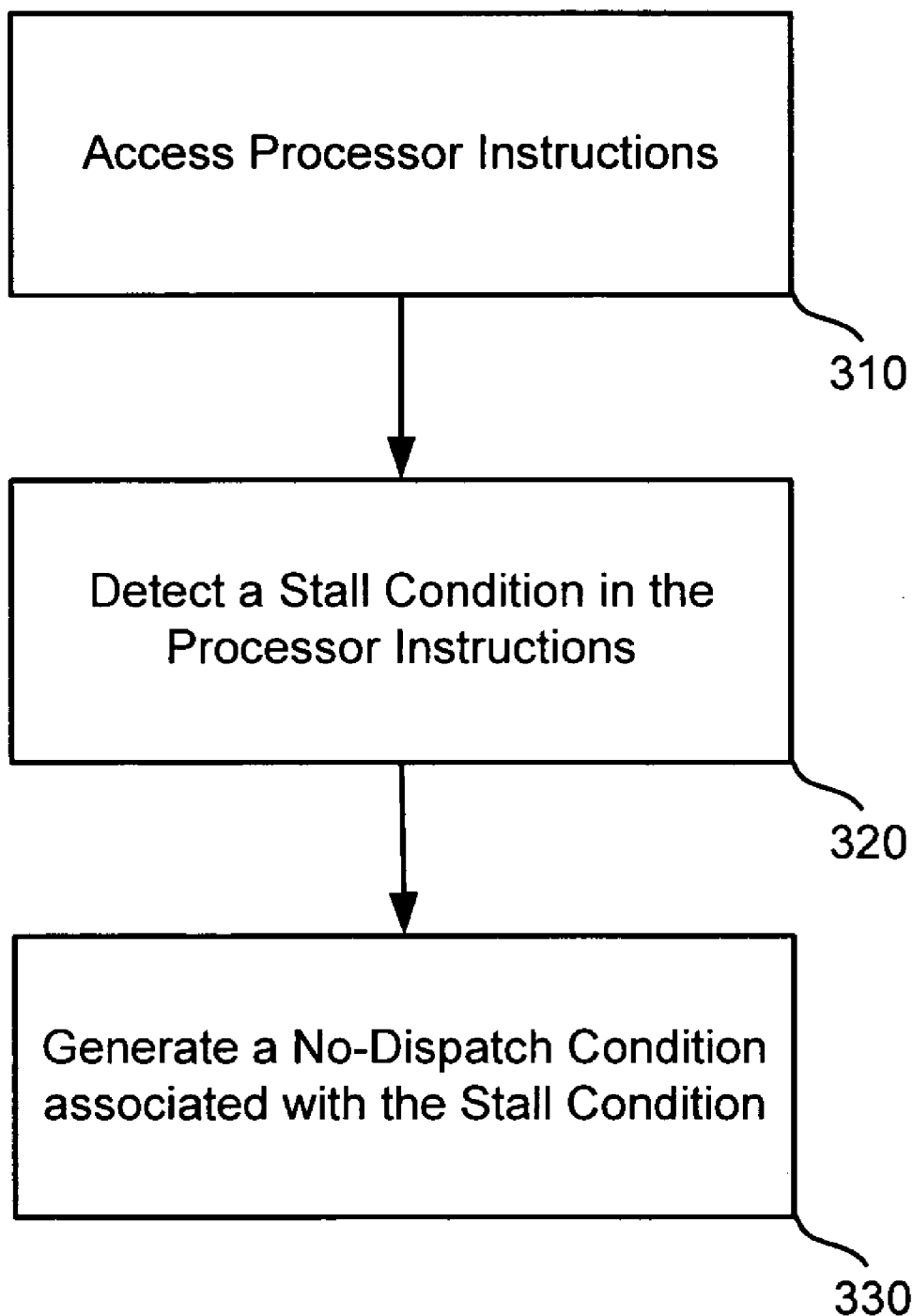
FIG. 3 illustrates one embodiment of a method for generating a no-dispatch condition.

FIG. 3 illustrates one embodiment of a method 300 for detecting a stall condition and generating a no-dispatch condition. Method 300 begins with accessing processor instructions at step 310. The processor instructions can be accessed in many ways as described in more detail below. Next, a stall condition is detected in the processing instructions at step 320. A no-dispatch condition associated with the stall condition is then generated at step 330. The generalized steps 310, 320 and 330 can be performed while generating or executing processor instructions by software or by hardware described herein. Examples of these embodiments are described in further detail below.

Figure 4:
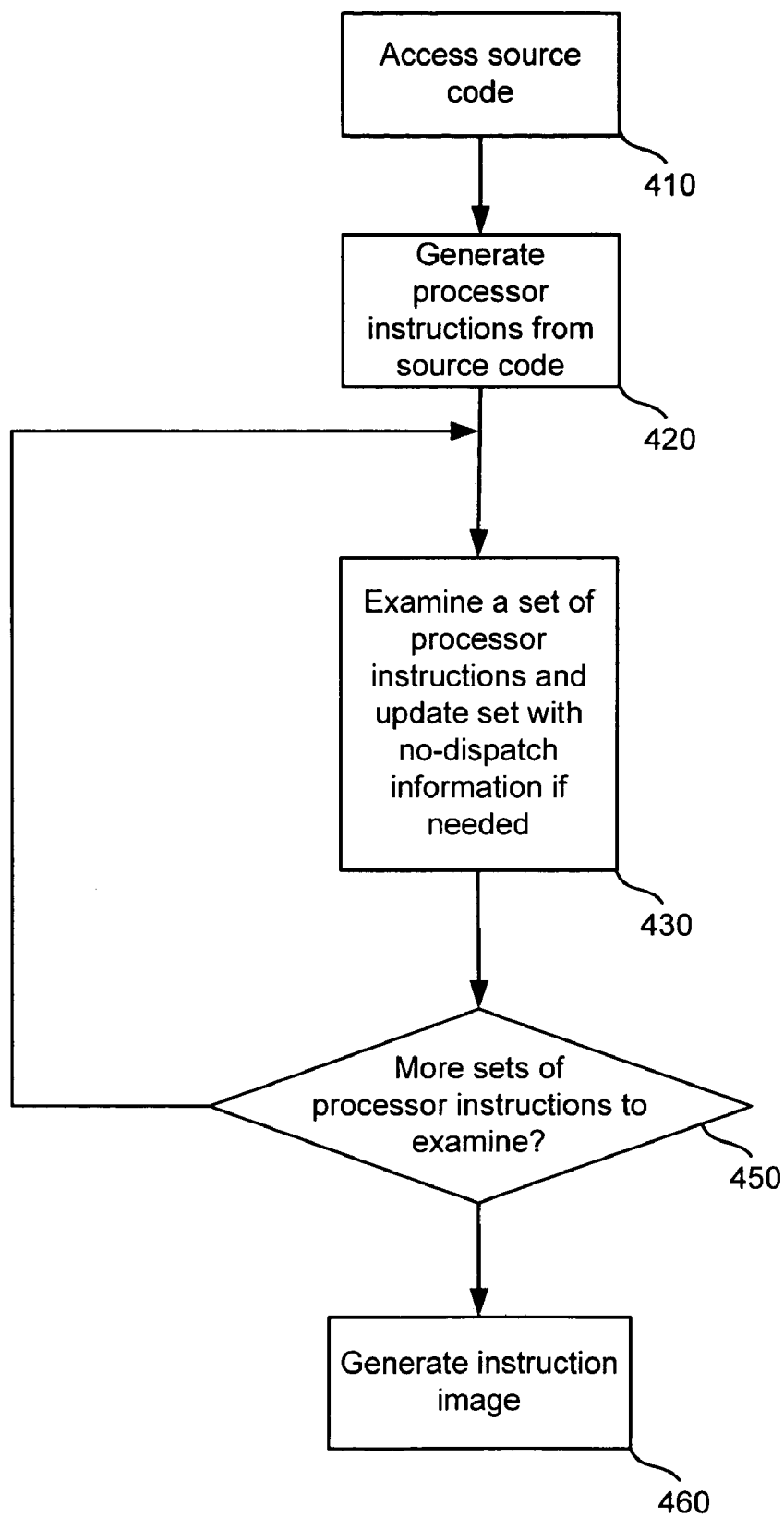
FIG. 4 illustrates one embodiment of a method for detecting a stall condition and generating a no-dispatch condition before execution of processor instructions.

FIG. 4 illustrates one embodiment of a method 400 for detecting a stall condition and generating a no-dispatch condition during generation of processor instructions. First, source code is accessed at step 410. Next, processor instructions are generated from the source code at step 420. In some embodiments, a compiler program can perform steps 410 and 420. In this case, for example, the source code may be in C, C++ or some other source language and the processor instructions will be assembly code or object code. In some embodiments, an assembler program can perform steps 410 through 420. In this case, the source code is assembly code and the processor instructions generated from the source code are object code. In some embodiments, a combination of one or more compiler programs, one or more assembler programs, or other processor instruction-generation programs can perform steps 410-420. For the discussion below, the instructions generated from the source code will be referred to herein as processor instructions.

A set of processor instructions are examined and updated as needed at step 430. A compiler program, assembler program or other software program can be used to examine the processor instructions. In one embodiment, examining instructions can include accessing and parsing a set of processor instructions. During examination, a software program determines whether any stall conditions exist within the set of instructions. The software then updates the set of instructions with no-dispatch information. No-dispatch information describes how a dispatcher such as dispatch unit 230 of FIG. 2A should handle the stall condition. Examination of a set of processor instructions is discussed in more detail below with respect to FIG. 5.

In one embodiment, steps 420-430 can be performed concurrently by a compiler, optimization software, instruction scheduling software or other software. When performed concurrently, the stall condition can be detected while a software program generates the processor instructions. In another embodiment, the steps of examining and updating can be performed separately by separate software.

After the set of instructions has been examined and updated, the software determines whether more sets of processor instructions should be examined at step 450. In one embodiment, additional examination is required if one or more sets of processor instructions to be executed by an instruction processing system have not been examined. If additional examination is required, operation continues to step 430. If no additional examination of processor instruction sets is required, operation continues to step 460. In one embodiment, a single instruction may be included in multiple sets of processor instructions which are to be examined for stall conditions. In this case, the instruction may be examined one or more times. An instruction image is generated at step 470. If any stall conditions were detected at step 430-440, the instruction image will incorporate no-dispatch information into one or more processor instructions.

In one embodiment, the steps of 430-460 can be performed at any time prior to the execution of the processor instructions. Thus, detection of a stall condition and generation of a no-dispatch condition is not limited to the time when the processor instructions are executed.

Figure 5:
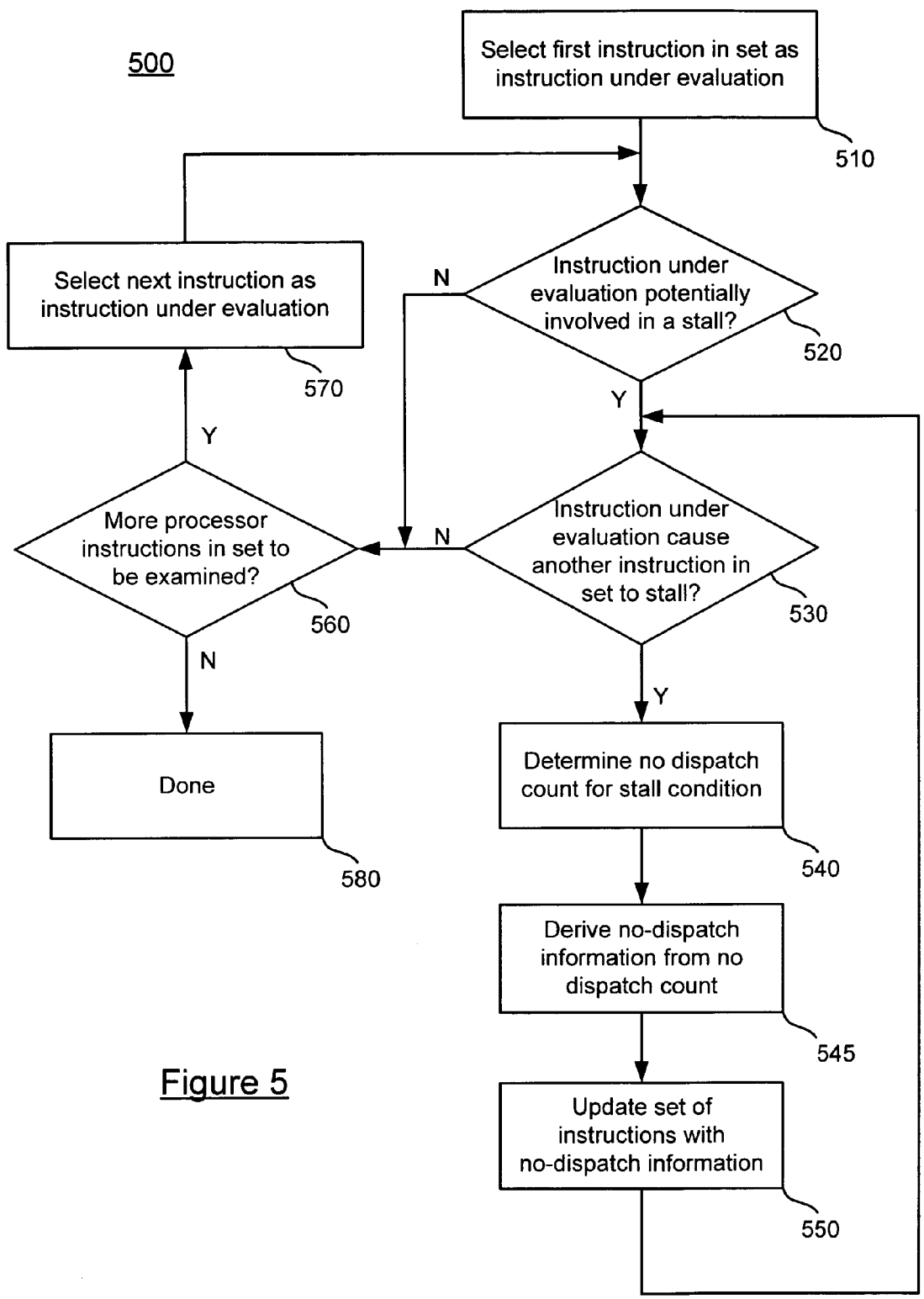
FIG. 5 illustrates one embodiment of a method for examining a set of processor instructions.

FIG. 5 illustrates one embodiment of a method 500 for examining and updating a set of instructions as discussed above in step 430 of method 400. In some embodiments, method 500 can be implemented by a compiler program, an assembler program or some other software program. The software performing method 500 can also be combined with optimization techniques, instruction scheduling techniques, and other software. Method 500 begins with selecting a first processor instruction from the set of processor instructions as the instruction under evaluation at step 510. Next, a determination is made as to whether the processor instruction under evaluation is potentially involved in a stall condition at step 520. A processor instruction can be involved in a stall if execution of the processor instruction can cause a subsequent instruction to stall. The types of instructions that can be involved in a stall are discussed below with respect to FIG. 5. If the software determines that the processor instruction under evaluation cannot be involved in a stall, operation continues to step 560. If the software determines that the processor instruction under evaluation can be involved in a stall, operation continues from step 520 to step 530.

At step 530, the set of instructions is examined to determine whether a stall condition will occur when the instruction stream is executed. The stall condition generally involves a first occurring instruction under evaluation which is potentially involved in a stall and a second occurring stall causing instruction. Steps 520 and 530 are discussed in more detail below. If no stall condition is detected, operation proceeds to step 560. If a stall condition is detected in the processor instruction set, operation proceeds to step 540

The no-dispatch count associated with the stall condition is determined at step 540. The no-dispatch count can be determined using several methods. Examples of these methods are discussed in more detail below. Next, no-dispatch information is derived from the no-dispatch count at step 545. The no-dispatch information is used to update the instructions in the instruction set.

The set of instructions is then updated to include the generated no-dispatch information at step 550. Operation then returns to step 530 where the instruction under evaluation is compared with the updated set of instructions once again. In one embodiment, this will prevent situations wherein the addition of the no-dispatch information to the instruction stream alters the nature of the stalls which occurs or causes a new stall when the instruction stream is executed. When no more new stall conditions are detected at step 530, operation proceeds to step 560. The system determines whether more instructions in the set should be examined at step 560. If an additional instruction in the set has not been selected, the next instruction is selected as the instruction under evaluation at step 570 and operation continues to step 520. If no additional instructions are left to be selected, method 500 ends at step 580.

Steps of method 500 of FIG. 5 are now discussed in more detail. At step 520, an instruction is examined to determine if it can potentially be involved in a stall. In one embodiment, the types of instructions that can potentially be involved in a stall are stored in memory. For example, a list of processor instructions which may be involved in a stall may be contained in a look-up table stored in memory. In this case, at step 520, the software determines whether the instruction under evaluation is one of the processor instructions in the look-up table. Operation continues to step 530. Otherwise, no processing is required for the instruction under evaluation and the operation proceeds to step 560.

In one embodiment, all instructions are considered to be potentially involved in a stall at step 520. In another embodiment, a subset of instructions which cannot possibly cause a stall are not considered to be potentially involved in a stall. For example, a no-operation instruction (NOP) does not consume or produce any resources. Thus, if a NOP was compared to a potentially stall causing instruction, operation would proceed to step 560. Examples of instructions which can be involved in a stall include those that write a single port RAM, update a register, update a resource, update the result of a previous instruction or send information to another thread.

In one embodiment a subset of all instructions are considered to be potentially involved in a stall. Different criteria can be used to determine which instructions are in the subset. For example, a subset may include instructions which write to a register file. In another example, the subset may include commonly executed instructions which are most likely to be involved in a stall as determined by analysis of programs to be executed by the CPU. Limiting those instructions considered to be potentially involved in a stall to a subset of all instructions is advantageous in that the processing time of method 500 may be reduced. If the subset is appropriately chosen in this manner, the reduction in the time to process method 500 may result in only a modest loss in performance.

In one embodiment, the instruction under evaluation at step 530 is compared with all other instructions in the set of instructions. It is determined whether the combination of the two instructions and their location in the instruction stream can result in a stall. Techniques known in the art of compilation and optimization can be used to determine if a stall will occur between two compared instructions. These include using tables indexed by the instructions. They also include using dependency graphs to identify the minimum spacing between instructions required to avoid a stall. In one embodiment, steps 420 and 430 can be combined as previously described to simultaneously employ techniques to reorder instructions, eliminate stalls and determine which stalls, if any, cannot be avoided.

A no-dispatch count is determined at step 540 of method 500. The no-dispatch count can be determined in a variety of ways. In one embodiment, dispatcher 230 can process a limited set of no-dispatch count values. For example, the no-dispatch counts which can be processed may be limited to the values 3, 8, 12. In this case the no-dispatch count is converted to no-dispatch information which selects a value from the limited set of no-dispatch counts which is greater than or equal to the no-dispatch count. In one embodiment, a reference to a value in the limited set of no-dispatch counts is included in the instruction image in step 550. The dispatcher then uses the reference to determine the actual no-dispatch count. For example, three no-dispatch counts 3, 8, 12 may be stored in registers. The register address may be included in the no-dispatch information added to the instruction image. The limited set of no-dispatch counts may be decoded directly from a the no-dispatch information included in the instruction image. In one embodiment, the original no-dispatch count may be compared with the limited set of no-dispatch counts which the dispatcher can handle. The smallest no-dispatch count that is greater than or equal to the original no-dispatch count is selected to create the no-dispatch information.

In another embodiment, the no-dispatch count can be determined as the difference of the number of processing cycles required to execute the instruction under evaluation and the minimum number of instructions between the dispatch of the instruction under evaluation and the dispatch of the stall causing instruction. For example, the instruction under evaluation may require ten cycles to complete execution. A subsequent instruction which causes a stall may be scheduled to be dispatched four cycles after dispatch of the instruction under evaluation. The no-dispatch count in this case is six processing cycles: ten cycles required to complete execution of the instruction under evaluation minus the four cycles between the dispatch of stall causing instructions.

In another embodiment, the no-dispatch count can be determined as the difference of 1) the number of processing cycles required in execution before the instruction under evaluation produces or releases the resource potentially causing a stall, and 2) the number of processing cycles required during execution of the stall causing instruction before the instruction requires the resource. For example, the instruction under evaluation may require ten cycles to complete a write to a register file. The subsequent instruction may read the register after three processor cycles of execution. The no-dispatch count will then be seven cycles (10−3=7).

In another embodiment, the no-dispatch count can be derived from three values: 1) the first is the number of processing cycles during execution before the instruction under evaluation produces or releases a resource, 2) the number of processing cycles required in execution before the stall causing instruction requires the resource, and 3) the minimum number of processor cycles between the dispatch of the instruction under evaluation and dispatch of the potentially stalled instruction. The no-dispatch count is derived from subtracting the second value (use of resource) and third value (wait produced by delay in dispatch) from the first value (production of resource). For example, the instruction under evaluation may require ten cycles to complete a write to a register file. The subsequent stall causing instruction may read the register after three processor cycles of execution. The subsequent instruction may have been dispatched four cycles after dispatch of the instruction under evaluation. The no-dispatch count will then be three cycles, derived by subtracting three cycles due to the register read and four cycles due to the dispatch period distance from ten cycles associated with the register write.

In another embodiment, the no-dispatch count is comprised of two values instead of one. The first value is a latency which is the same as the no-dispatch count produced by any other embodiment of step 545 which produces a single latency value, including those described in previous paragraphs. This value represents the minimum time between dispatching the instruction under evaluation and the stall causing instruction which is required to avoid a stall. The second value is a reference to the instruction which causes the stall. The value associated with the stall causing instruction may be the distance between the instruction under evaluation and the stall causing instruction in the instruction image. In one embodiment, the distance between the two instructions is the minimum time between dispatching the two instructions, the address of the instruction or some other value that distinguishes the stall causing instruction. In this embodiment, the no-dispatch count consisting of the two values is used to update the set of the instructions at step 550.

In one embodiment the no-dispatch count is comprised of three values instead of one. The first and second values describe the period of time during which the stall causing instruction should not be dispatched. The third value is a reference to the instruction which causes the stall. The value associated with the stall causing instruction may be the distance between the instruction under evaluation and the stall causing instruction in the instruction image. In one embodiment, the distance between the two instructions is the minimum time between dispatching the two instructions, the address of the instruction or some other value that distinguishes the stall causing instruction. In this embodiment, the no-dispatch count consisting of the two values is used to update the set of the instructions at step 550.

The first two values may be calculated with a) the period of time during execution of the instruction under evaluation when the resource is required and b) the period of time during execution when the stall causing instruction requires the use of the resource. For example, suppose an instruction under evaluation requires four cycles to access a single ported register file and that the access begins 7 cycles after the instruction is dispatched. Further, suppose the stall causing instruction requires 2 cycles to access the register file and that the access begins 3 cycles after the stall causing instruction is dispatched. If the stall causing instruction is dispatched between 3 to 10 cycles (inclusive) after the instruction under evaluation then a stall will occur. In this example the third value refers to the stall causing instruction and the first value would be set to 3 and the second value would be set to 10.

While several embodiments for deriving the no-dispatch count have been described, other methods for examining a set of instructions and detecting one or more stall conditions may be used to derive the no-dispatch count. Additionally, other forms of a no-dispatch count and no-dispatch information which is derived from a no-dispatch count, added to the instruction stream and interpreted by dispatch unit 230 to delay dispatch of instructions may be used.

Figure 6A:
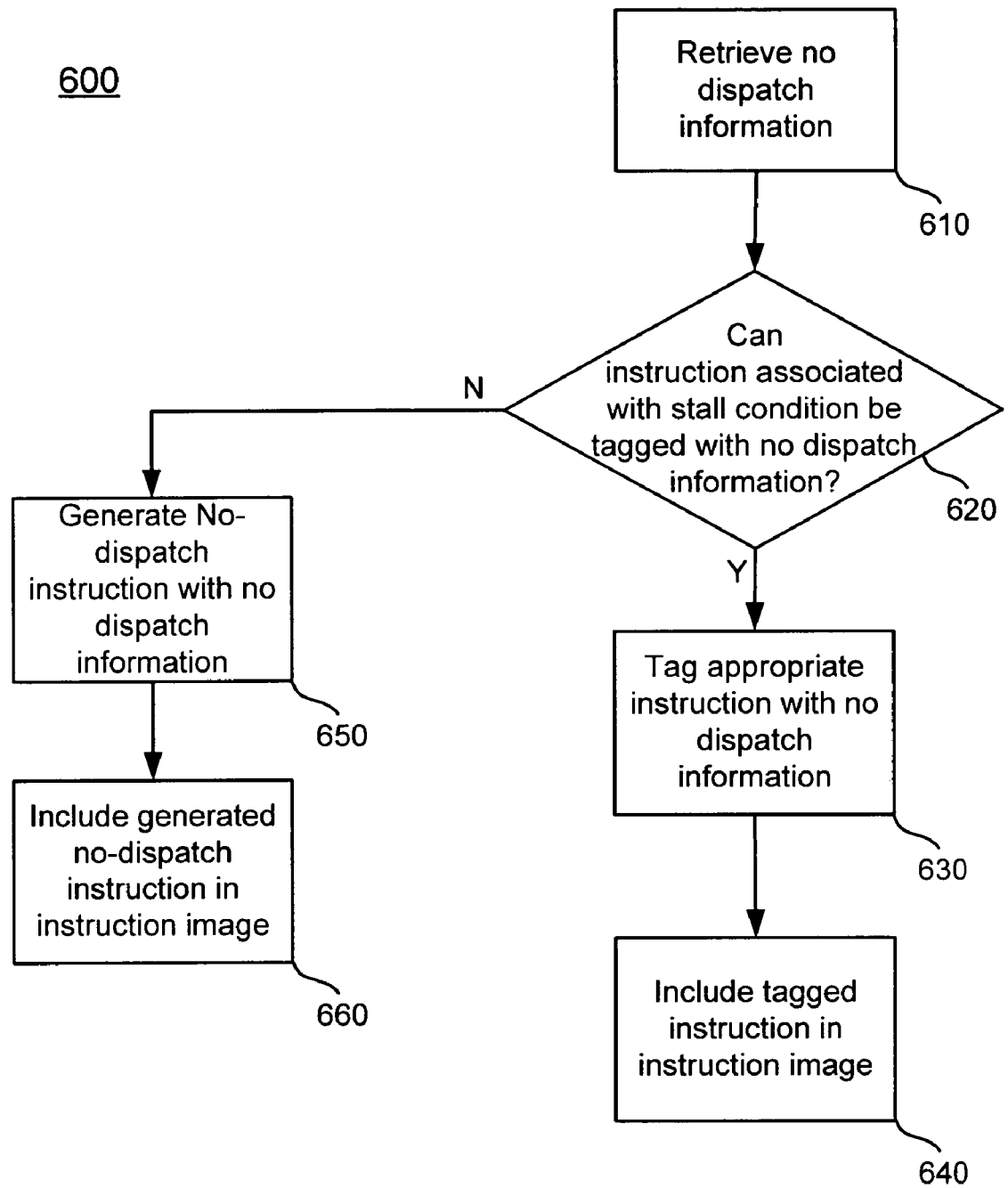
FIG. 6A illustrates one embodiment of a method for configuring a no-dispatch condition before execution of processor instructions.

FIG. 6A illustrates one embodiment of a method 600 for updating a set of instructions with no-dispatch information as discussed in step 550 of method 500 above. If not already retrieved, the no-dispatch information is retrieved at step 610. Next, it is determined whether the instruction causing the stall condition can be tagged with the no-dispatch information at step 620. As described above, the no-dispatch information can include processor cycle information, for example, the number of processor cycles equal or greater than the number of cycles for which a resource is unavailable because of the potentially involved instruction. If the instruction cannot be tagged, operation continues to step 650. If the instruction can be tagged with no-dispatch information, operation continues to step 630.

Returning to method 600, once the instruction is tagged with the no-dispatch information at step 630, the tagged instruction is included in the instruction set at step 640. No-dispatch information is added or "tagged" to the stall causing instruction if there are available bits in the encoding for that instruction. A processor instruction has space for another field if bits in the processor instruction can be set to represent no-dispatch information. In one embodiment, no-dispatch information can be added by setting a bit value to indicate the instruction includes no-dispatch information and setting one or more bits to the no-dispatch information.

In one embodiment, a no-dispatch information field is always present in a subset of processor instructions. If there is no stall condition, the field is set to a specified value (for example, 0). Otherwise the field contains the no-dispatch information. Using an additional field in the instruction is advantageous in that generation of additional no-dispatch instructions is not required. In one embodiment, adding additional no-dispatch information to an instruction can be used in processing machines utilizing very long instruction words.

At step 650, a new no-dispatch instruction is generated with the no-dispatch information. This new instruction is then added to the instruction set in step 660. This is advantageous in that additional bits are not required in the instruction encoding of existing instructions.

Figure 6B:
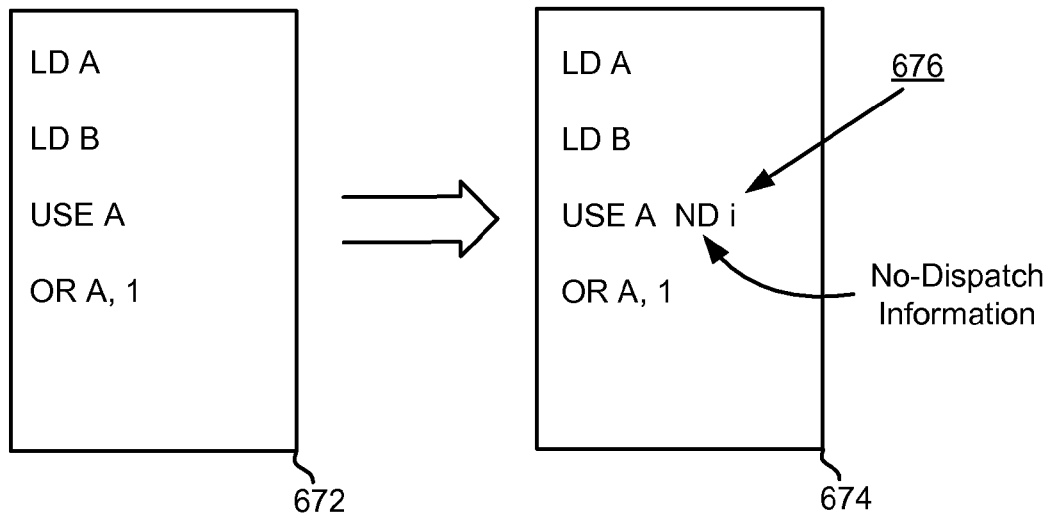
FIG. 6B illustrates an example of a processor instruction set having a no-dispatch processor instruction.

FIG. 6B illustrates one embodiment of two sets of processor instructions, illustrating addition of no-dispatch information to a processor instruction as discussed above at step 630 of method 600. FIG. 6B includes a first set of instructions 672 and a second set of instructions 674. First set of instructions 672 includes LD A, LD B, USE A and OR A,1. After LD A is selected as the instruction under evaluation at step 510 or step 570 and potentially involved in a stall at step 520, the USE A instruction is identified as an instruction causing a stall condition at step 530. The no-dispatch count is converted to the no-dispatch information which, in this example, is the value 'i'. Processor instruction set 674 illustrates no-dispatch information "ND i" added to the USE A processor instruction of instruction set 672. Processor instruction 676 indicates that, when the USE A instruction is read, dispatch unit 230 should not dispatch the instruction USE A from the corresponding thread for i cycles.

The value for i can be determined by any method including techniques currently employed by compilers and optimizers. In some embodiments, the no-dispatch information of processor instruction 676 is implemented in the bits of a processor instruction. The process of converting the instruction from the text instruction 676 to an actual machine encoding is well known in the art.

Figure 6C:
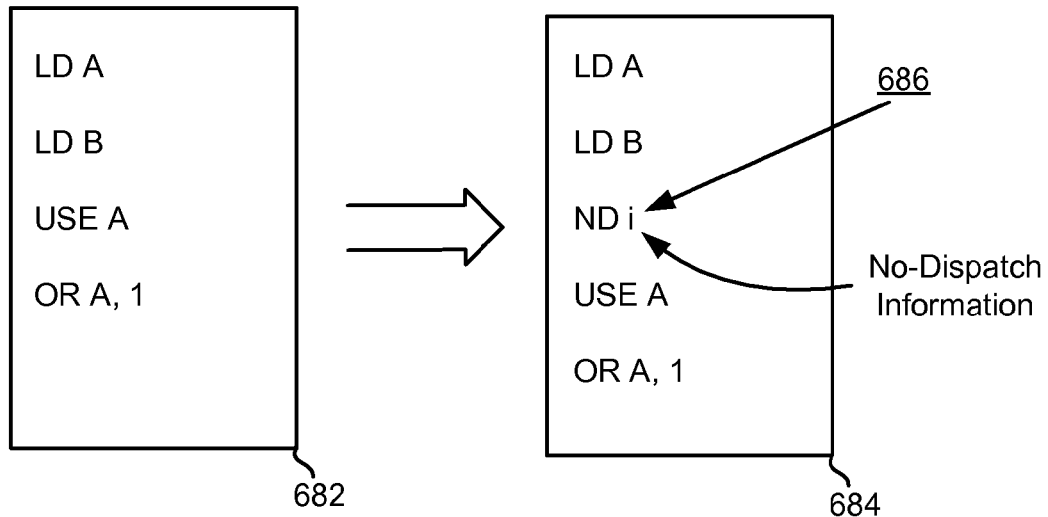
FIG. 6C illustrates another example of a processor instruction set having a no-dispatch processor instruction.

FIG. 6C illustrates two sets of processor instructions illustrating the generation of a no-dispatch instruction discussed above with respect to step 650 of method 600. Instruction set 682 includes a LD A, LD B, USE A and OR A,1 processor instruction. After LD A is selected as the instruction under evaluation at step 510 or step 570 and is determined to be potentially involved in a stall at step 520 the USE A instruction is identified as an instruction causing a stall at step 530. The no-dispatch count is converted to the no-dispatch information which, in this example, is the value 'i'. Instruction set 684 includes instructions LD A, LD B, ND i processor instruction 686, USE A and OR A,1 processor instructions. No-dispatch instruction 686 is inserted into instruction set 684 just prior to the USE A instruction that causes the stall. The no-dispatch instruction 686 indicates a number of cycles i for which processor instructions from the current thread should not be dispatched. The number of cycles i is associated with the no-dispatch count and can be retrieved or derived as determined as described above. After instruction 686 is constructed with the no-dispatch information, instruction 686 is included in the instruction image at step 640.

Figure 6D:
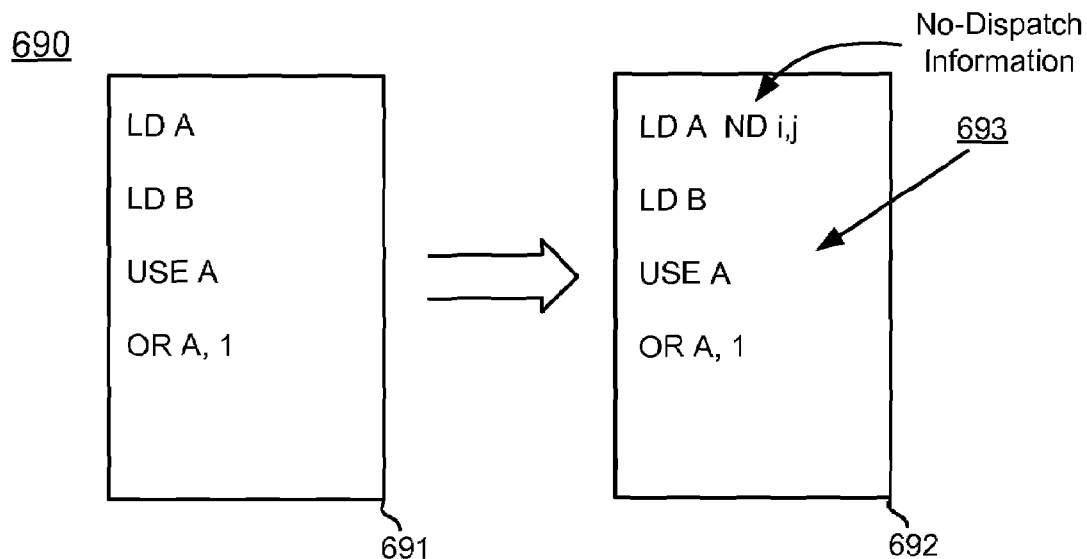
FIG. 6D illustrates another example of a processor instruction set having a no-dispatch processor instruction.

In one embodiment, the no-dispatch information is comprised of multiple values which are added to the instruction stream. An example of two sets of processor instructions illustrating addition of no-dispatch information to a processor instruction is illustrated in FIG. 6D. The no-dispatch information includes processing cycle and subsequent instruction reference information. FIG. 6D includes a first set of instructions 691 and a second set of instructions 692. First set of instructions 691 includes LD A, LD B, USE A and OR A,1, similar to instruction set 672 of FIG. 6B. As discussed above with reference to instruction set 672, the USE A instruction causes a stall by attempting to access register A before the LD A instruction has updated A.

Second processor instruction set 692 includes LD A ND I,j, LD B, processor instruction USE A 693, and OR A,1. Processor instruction set 692 illustrates no-dispatch information "ND i,j" added to the LD A processor instruction of instruction set 691. In this case, the referenced instruction j of the no-dispatch information is the USE A instruction. Processor instruction 693 indicates that, when the USE A instruction is read, the dispatch unit 230 should not dispatch the referenced instruction USE A from the corresponding thread until i cycles after the instruction LD A has been dispatched. The value for i can be set to the no-dispatch count determined from a look-up table or other source as discussed above. This is advantageous because instructions from other threads can be dispatched for other reasons between the dispatch of "LD A" and "USE A". The dispatcher can count these dispatch slots used for other threads against the count required spacing specified by the value 'i'.

Figure 6E:
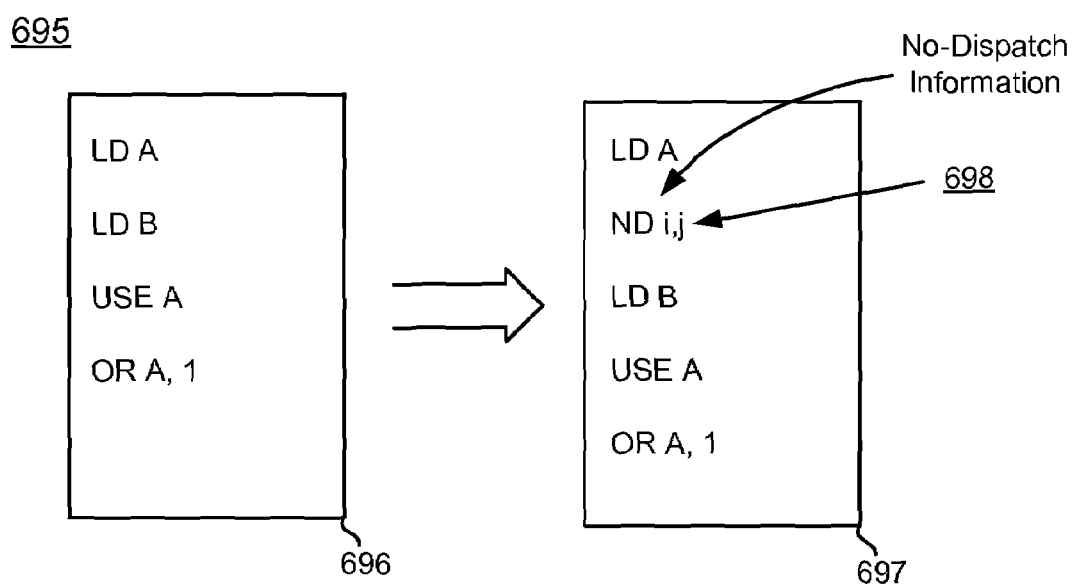
FIG. 6E illustrates another example of a processor instruction set having a no-dispatch processor instruction.

FIG. 6E illustrates one embodiment of two sets of processor instructions illustrating the generation of a no-dispatch instruction. The no-dispatch instruction includes processing cycle and subsequent instruction reference no-dispatch information. Instruction set 696 includes a LD A, LD B, USE A and OR A,1 processor instruction, similar to instruction set 682 of FIG. 6C. As discussed above with reference to instruction set 682, the USE A processor instruction causes a stall when it attempts to reference 'A' before it has been updated by the LD A processor instruction. Instruction set 697 includes LD A, ND i,j processor instruction 698, LD B, USE A and OR A,1 processor instructions. No-dispatch instruction 698 is inserted into instruction set 697 after the LD A instruction and before the USE A instruction that causes the stall. The j parameter of no-dispatch instruction 698 references the USE A instruction.

Processor instruction 693 indicates that, when the USE A instruction is read, dispatch unit 230 should not dispatch the referenced instruction USE A from the corresponding thread until i cycles after the instruction LD A has been dispatched. As illustrated, the referenced stall-causing instruction need not be the instruction immediately following the instruction containing no-dispatch information in the particular thread. The number of cycles i is associated with the no-dispatch count and can be retrieved or derived as determined as described above.

Though FIGS. 6B-E illustrate the addition of no-dispatch information having one or two values (i or i,j) to an instruction stream, other formats of no-dispatch information can be inserted into instruction streams in a similar manner. For example, no-dispatch information consisting of three values, (i,j,k), can be added to an instruction stream as discussed herein.

While FIGS. 6B-E show the no-dispatch information being added at or just before the USE A instruction, the no-dispatch information may be inserted at other places in the instruction stream. For example, in FIG. 6B the ND information can be added to the LD B instruction. Because there is one instruction between LD B and USE A, the value of 'i' can be decreased to 'i–1'. Thus, the altered instruction would be 'LD B ND i–1'. This can be particularly advantageous if one of the instructions between the instruction under evaluation and the stall causing instruction has room to add the no-dispatch information and other instructions do not. It may also be advantageous if an instruction which cannot accommodate no-dispatch information must appear in the instruction stream in a particular location for other reasons, including optimization to avoid stalls.

In one embodiment, the no-dispatch information may replace an existing nop instruction. For example, suppose the sequence of instructions in FIG. 6B was originally 'LD A, NOP, LD B, USE A' and that 'USE A' could not accommodate the no-dispatch information 'ND i'. Then, it could be advantageous to replace the NOP with 'ND i–1' as opposed to adding another instruction.

In some embodiments, the software may re-examine the instruction set or the instruction image after the addition of no-dispatch information. Because the no-dispatch information will alter the instruction execution sequence in known ways, additional optimizations may be possible. For example, suppose several NOP instructions were present in the instruction stream to delay the dispatch of a stall causing instruction. After the no-dispatch information is added, the NOPs may no longer be required because the no-dispatch information added to the stall causing instruction or another instruction occurring before the stall causing instruction will delay the dispatch of the stall causing instruction. Thus, the NOPs are no longer needed and may be removed to reduce the code image. In another embodiment, instructions may be reordered. In yet another embodiment, the optimization code may determine that the instructions can now be re-ordered to obtain more optimal performance. The optimization techniques applied to an instruction set or instruction image may also be combined with techniques to detect stall conditions and insert no-dispatch information.

Figure 7:
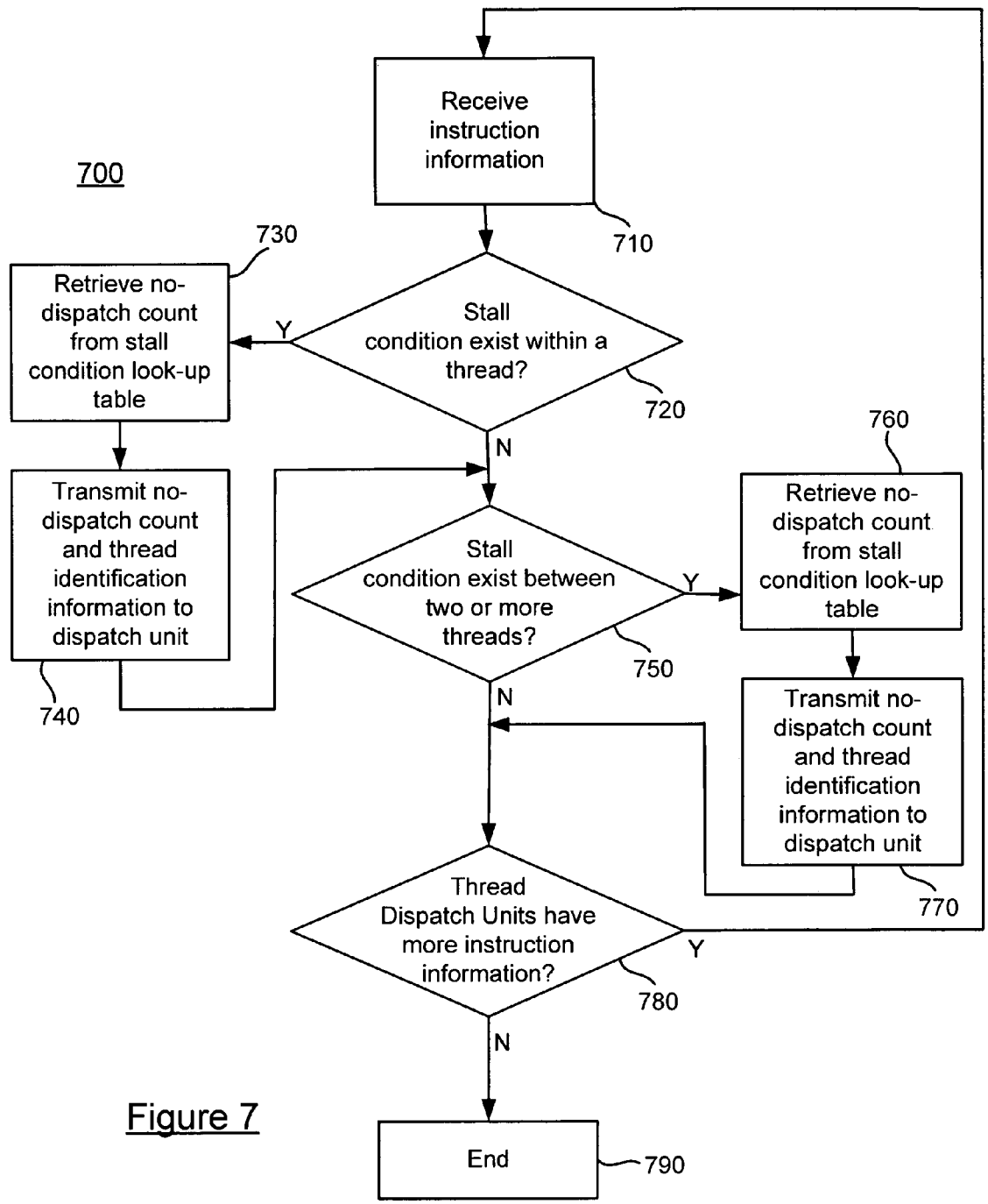
FIG. 7 illustrates one embodiment of a method for examining instructions to detect a stall condition using hardware.

FIG. 7 illustrates one embodiment of a method 700 for detecting a stall condition and generating a no-dispatch condition during execution of processor instructions by hardware. In one embodiment, the steps of method 700 can be performed by dispatch pre-decode unit 220. Instruction information is received at step 710. In one embodiment, instruction information is received by dispatch pre-decode unit 220 from one or more instruction fetch units. The instruction information can include the instructions themselves, an instruction memory address or other instruction information. Next, the dispatch pre-decode unit 220 determines if a stall condition exists within a thread at step 720. In one embodiment, determining if a stall condition exists includes accessing instructions associated with an instruction fetch unit and determining if any two or more instructions will cause a stall condition. This process is similar to that discussed above with respect to FIG. 5.

If no stall condition is determined to exist within a particular thread, operation continues to step 750. If a stall condition is determined to exist within a thread, operation continues to step 730. A no-dispatch count is retrieved from a stall condition look-up table or some other source at step 730. In some embodiments, a no-dispatch count can be retrieved from a stall-condition lookup table stored in memory or otherwise derived by the instructions involved in the stall. The no-dispatch count determined at step 730 and thread identification information is then transmitted to dispatch unit 230 at step 740. Dispatch unit 230 receives the no-dispatch count for a particular thread from dispatch pre-decode unit 220 about the same time it receives the stall causing instruction. Dispatch unit 230 avoids dispatching the stall causing instruction from the particular thread for a period of time associated with the no-dispatch count. Operation continues from step 740 to step 750.

At step 750, dispatch pre-decode unit 220 determines if a stall condition exists between two or more threads. In one embodiment, dispatch pre-decode unit 220 can detect stalls between multiple threads not previously detected by prior systems and software that analyze instructions. In one embodiment, to determine if a stall exists between instructions from different threads, the dispatch pre-decode unit 220 accesses or receives a stream of instruction information from two or more threads. The dispatch pre-decode unit then determines if an instruction from one thread causes a stall with an instruction from another thread. This process is similar to that described above with respect to FIG. 5 except that processor instructions from multiple threads are accessed and compared. An example of a stall condition existing between more than one thread includes tightly choreographed information sharing between threads.

If no stall condition exists between two or more threads, operation continues to step 780. If a stall condition does exist between two or more threads, a no-dispatch count is retrieved from a stall condition look-up table or other source at step 760. This is performed in the same manner that a no-dispatch count is retrieved at step 730. In one embodiment, the no-dispatch count includes three values. The first is a pointer to the stall causing instruction (including a thread identifier) and the second and third define a period of time during which the stall causing instruction should not be dispatched. This method was discussed in more detail above and is particularly useful when attempting to avoid stalls involving instructions executed by different threads.

Next, the no-dispatch information and thread identification information is transmitted to dispatch unit 230 for a particular thread at step 770. The thread associated with the no-dispatch count is the thread containing the instruction. Dispatch unit 230 avoids dispatching the stall causing instruction from the particular thread for a period of time associated with the no-dispatch count. After the no-dispatch information is transmitted, operation continues to step 780.

In one embodiment method 600 and method 700 are combined. During the generation of the instruction image, software may determine which instructions are likely to be involved in a stall condition. The software then adds no-dispatch pre-decode information to those instructions or new instructions which identify the instructions which are likely to be involved in a stall condition. During execution, dispatch pre-decode 230 examines the instructions for this no-dispatch pre-decode information. Dispatch pre-decode 230 then implements method 700 considering the instructions which are likely to be involved in a stall condition as identified by the no-dispatch pre-decode information to be the instruction under evaluation.

Dispatch pre-decode unit 220 determines whether the thread dispatch units 230 have additional instruction information to be processed at step 780. If additional instruction information exists, operation continues to step 710. If no additional instruction information needs to be processed, operation ends at step 790.

Figure 8A:
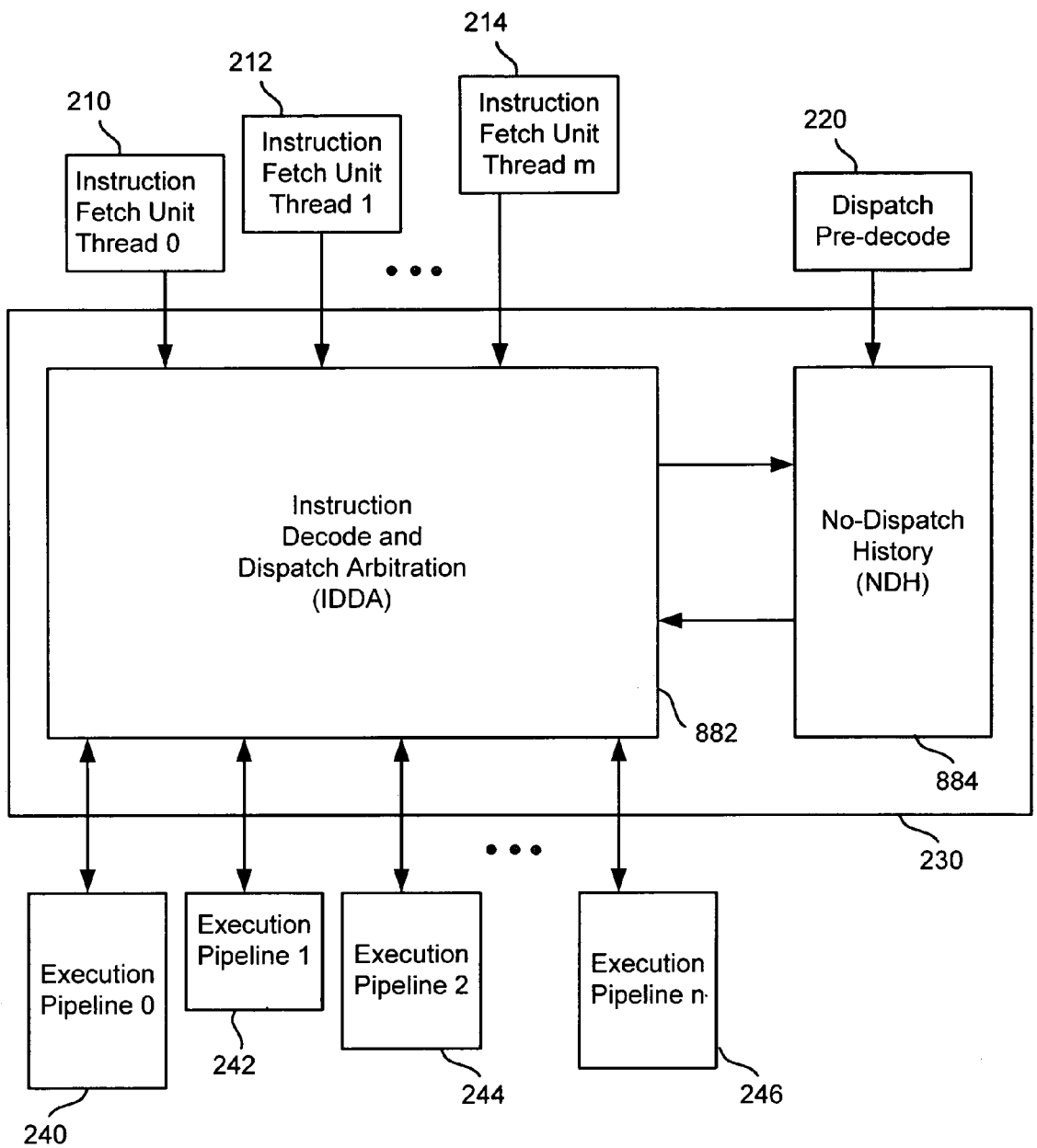
FIG. 8A illustrates one embodiment of a dispatch unit.

Dispatch unit 230 processes instructions from IFUs 210-214 and no-dispatch information generated by dispatch pre-decode 220 as discussed above in method 700. FIG. 8A illustrates one embodiment of dispatch unit 230. Dispatch unit 230 is comprised of instruction decode and dispatch arbitration (IDDA) 882 and no-dispatch history (NDH) 884. NDH 884 receives no-dispatch information from dispatch pre-decode 220. IDDA 882 receives instructions from one or more instruction fetch units and is connectively coupled to NDH 884 and execution pipelines 240-246. The operation of dispatch unit 230 is described below with reference to method 800 of FIG. 8B.

Figure 8B:
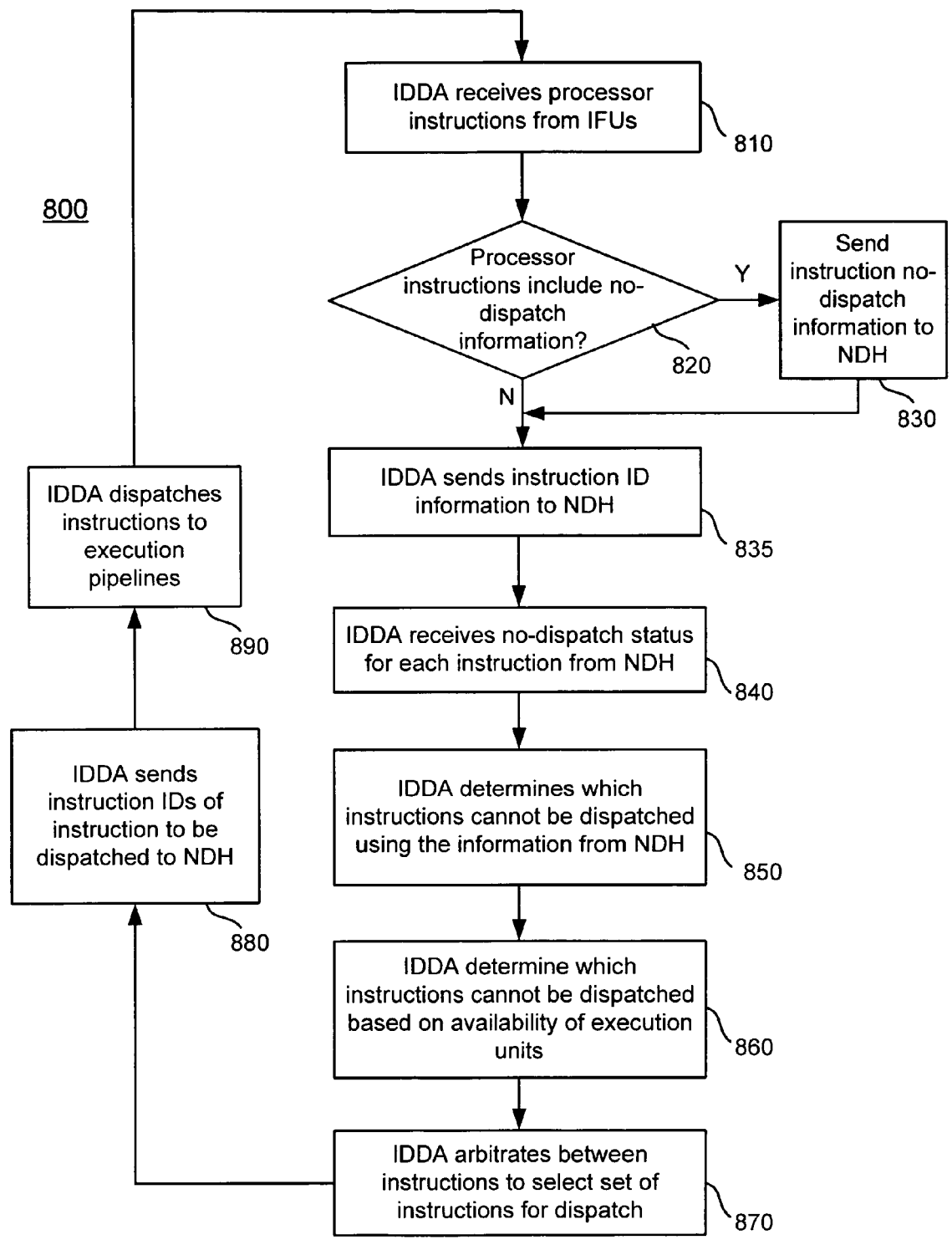
FIG. 8B illustrates one embodiment of a method for processing processor instructions by an Instruction Decode and Dispatch Arbitration.

FIG. 8B illustrates one embodiment of a method 800 for processing a set of instructions including no-dispatch information by Instruction Decode and Dispatch Arbitration 882 of FIG. 8A. In one embodiment, processor instructions are generated by the methods of FIGS. 4, 5 and 6A and processed according to the steps of method 800. Method 800 begins with receiving processor instructions from IFUs by IDDA 882 at step 810. Processor instructions can be received from IFUs 210-214.

Next, a determination is made as to whether the processor instructions include no-dispatch information at step 820. If the processor instructions do not contain no-dispatch information, operation continues to step 840. If the processor instructions received at step 810 contain no-dispatch information, operation continues to step 830. The no-dispatch information contained within the instructions is retrieved and sent to NDH 884 at step 830. Any information required to associate the no-dispatch information with a particular instruction or a particular thread is included in the information sent to NDH. Operation then continues to step 835, where IDDA sends instruction ID information to NDH. This instruction ID information indicates identification information for instructions received from the IFUs and not discarded. In some embodiments, an instruction may contain only no-dispatch information. In such embodiments, those instructions may be identified to NDH so that NDH knows the instruction will not be dispatched. Any information regarding an instruction which is passed back from NDH will include the ID of that instruction. Operation then proceeds to step 840.

Next, at step 840, IDDA 882 receives, no-dispatch status from NDH 884. associated with each instruction which has been received from the IFUs in step 810 but has not been dispatched to the execution units. In one embodiment, a no-dispatch status setting of dispatch_prohibited indicates that the associated instruction should not be dispatched and a no-dispatch status setting of dispatch_ok indicates that the associated instruction should not be dispatched. In some embodiments, the no-dispatch status received at step 840 is derived solely from the no-dispatch information sent to NDH in step 830. In some embodiments, the no-dispatch status is derived solely from other no-dispatch information sent to NDH by Dispatch Pre-decode 220. In some embodiments, the no-dispatch status is derived from the no-dispatch information sent to NDH in step 830 and from other no-dispatch information sent to NDH by Dispatch Pre-decode 220. Operation then proceeds to step 850.

Next, IDDA creates a set of undispatched instructions which includes each of the instructions it has received in step 810, but which have not been dispatched at step 850. IDDA examines the no-dispatch status for each instruction in the set of undispatched instructions to create a subset of undispatched instructions. If the no-dispatch status for an instruction indicates that it should not be dispatched, it is not included in the subset. Operation then proceeds to step 860 where IDDA determines which instructions in the subset of instructions identified in step 850 are destined for available execution pipelines. This set of instructions is referred to as the dispatchable set of instructions.

Operation then proceeds to step 870 where IDDA arbitrates between the instructions in the dispatchable set of instructions and selects one or more instructions from the dispatchable set of instructions based on priority. In one embodiment, instruction arbitration and selection may be performed as known in the art. In one embodiment, arbitration between threads includes selecting one or more available instructions from one or more instruction fetch units having the highest priority. In one embodiment, higher priority is given to instructions from threads having higher priority. In some embodiments, a lower priority thread may be dispatched depending on the execution units available. The instructions chosen among execution pipelines can be determined by one or more algorithms as widely known in the art. Next, IDDA sends the instruction IDs for each instruction which will be dispatched to NDH at step 880. Operation proceeds to step 880 where IDDA dispatches the chosen instructions to the appropriate execution pipelines.

Figure 9:
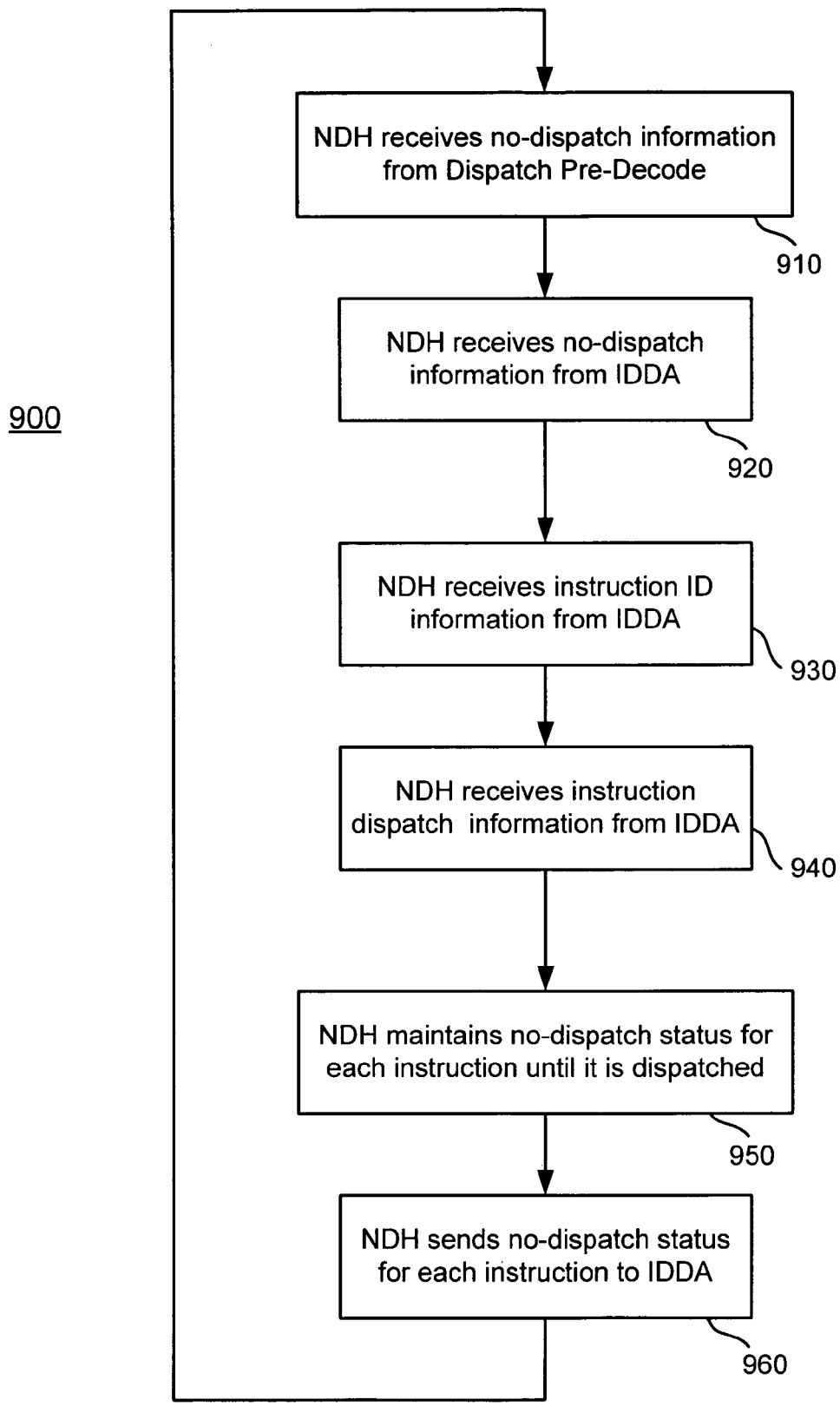
FIG. 9 illustrates one embodiment of a method for processing a set of instructions by No-Dispatch History.

FIG. 9 illustrates one embodiment of a method 900 for processing a set of instructions including no-dispatch information by No-Dispatch History (NDH) 884 of FIG. 8A. First, NDH receives no-dispatch information from Dispatch Pre-Decode 220 at step 910. This information may be generated as discussed above with reference to method 700 or by Dispatch Pre-Decode 220. Next, NDH receives no-dispatch information from IDDA at step 920. The no-dispatch information is as described above in relation to step 830 in method 800. Then, NDH receives instruction ID information from IDDA at step 930. The received instruction ID information is the information sent by IDDA as discussed above with reference to step 835 of method 800

NDH uses the information obtained in steps 910, 920, 930 and 940 to maintain no-dispatch status for each instruction at step 950. Maintaining no-dispatch information status for an instruction can be performed in several ways. In one embodiment, NDH receives a cycle count i, a thread identifier and an instruction ID. NDH then sets the no-dispatch status for every instruction in the identified thread which follows the instruction identified by the instruction ID to a setting of dispatch_prohibited. This status is maintained until a count of i cycles after NDH is notified that the instruction identified by the instruction ID is dispatched at step 940. Then, the no-dispatch status will be set to dispatch_ok.

In another embodiment, NDH 884 receives a no-dispatch count consisting of a two values 'i' and 'j' and an associated first instruction ID and thread. The value j is used by NDH to identify a second instruction ID. NDH then sets the no-dispatch status associated with second instruction ID to a setting of dispatch_prohibited until i cycles after it observes the dispatch of the instruction referred to by the first instruction ID.

In another embodiment, NDH receives cycle counts i and j, a first instruction ID, a value 'k' and a thread identifier. The value k is used by NDH to derive a second instruction ID. NDH then sets the no-dispatch status associated with the second instruction ID to a setting of dispatch_ok until a count of i cycles has passed after the instruction associated with the first instruction ID has been dispatched. Then, NDH sets the no-dispatch status associated with the second instruction ID to a setting of dispatch_prohibited until a count of j cycles have passed. After the j cycles have passed, the no-dispatch status associated with the second instruction ID is set to dispatch_ok.

Returning to method 900, after step 950, NDH identifies all instructions associated with instruction IDs that were received in step 930 but were not received at step 940 and transfers the no-dispatch status of each of these instructions to IDDA a step 960. This represents the set of instructions received by IDDA, but not dispatched by IDDA.

Methods 700 and 800 of FIGS. 7 and 8, respectively, can be applied to processor instructions simultaneously. This enables an instruction processing system to avoid stalls by recognizing no-dispatch information in processor instructions while concurrently analyzing the processor instructions for stall conditions. Performing both methods at the same time can catch more stall conditions and provide for a more stable processing environment.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A method for adding no-dispatch information to an instruction stream, comprising:
   accessing a set of instructions;
   detecting a stall condition between a first identified instruction and a second identified instruction in the set of instructions; and
   inserting no-dispatch information into the set of instructions, the no-dispatch information derived from the stall condition between the first identified instruction and the second identified instruction, the no-dispatch information including a reference to the second instruction which causes a stall with the first instruction.

2. The method of claim 1, wherein inserting no-dispatch information includes:
   inserting no-dispatch information into the set of instructions during compilation of the set of instructions.

3. The method of claim 1, wherein inserting no-dispatch information includes:
   inserting no-dispatch information into the set of instructions during execution of the set of instructions.

4. The method of claim 3, wherein detecting a stall condition includes:
   detecting a stall condition between instructions of two or more threads.

5. The method of claim 1, wherein said step of inserting no-dispatch information includes:
   adding a new instruction having no-dispatch information to the set of instructions or adding no-dispatch information to an existing instruction within the set of instructions or replacing an existing instruction in the set of instructions with a new instruction having no-dispatch information.

6. The method of claim 1, wherein the no-dispatch information includes a number of cycles or a number of cycles and a reference to an instruction which causes a stall or a minimum number of cycles and a maximum number of cycles and a reference to the instruction which causes a stall.

7. The method of claim 6, wherein the no-dispatch information is selected from a finite set of values.

8. The method of claim 1, further comprising:
   optimizing the set of instructions having the no-dispatch information.

9. The method of claim 8, wherein optimizing includes:
   analyzing the set of instructions having the no-dispatch information for a second stall condition.

10. The method of claim 8, wherein the no-dispatch information indicates when the second identified instruction can be dispatched.

11. A system for processing instructions, comprising:
    one or more instruction fetch units able to provide a set of instructions;
    a dispatch unit configured to receive the set of instructions from said one or more instruction fetch units; and
    one or more execution pipelines configured to receive instructions from said dispatch unit,
    the dispatch unit able to determine a first instruction which cannot be dispatched to the one or more execution pipelines based on no-dispatch information contained in the set of instructions, the dispatch unit able to identify one or more instructions in the set of instructions which can be dispatched while the dispatch of the first instruction is delayed, the first instruction included in the set of instructions;
    wherein one or more instructions contain the no-dispatch information, the dispatch unit able to discard the one or more instructions containing the no-dispatch information.

12. The system of claim 11, wherein the no-dispatch information includes:
    a number of cycles or a number of cycles and a reference to an instruction which causes a stall or a number of cycles a first instruction requires a resource, a number of cycles after which a second instruction will require use of the resource, and a reference to the second instruction.

13. The system of claim 12, wherein the no-dispatch information is selected from a finite set of values.

14. The system of claim 11, wherein the no-dispatch information is associated with one or more instructions of an instruction fetch unit, the dispatch unit able to dispatch instructions from instruction fetch units not associated with the no-dispatch information while instructions associated with the no-dispatch information are not dispatched.

15. A system for processing instructions, comprising:
    one or more instruction fetch units able to provide a set of instructions;
    a dispatch unit configured to receive the set of instructions from said one or more instruction fetch units;
    a dispatch pre-decode able to receive the set of instructions from the one or more fetch units and generate no-dispatch information, the no-dispatch information including a reference to an instruction which causes a stall; and
    one or more execution pipelines configured to receive instructions from said dispatch unit,
    the dispatch unit able to delay dispatch of instructions to the one or more execution pipelines in response to receiving no-dispatch information from said dispatch pre-decode.

16. The system of claim 15, wherein the no-dispatch information includes:
    a number of cycles and a reference to an instruction which causes a stall or a minimum number of cycles and a maximum number of cycles and a reference to the instruction which causes a stall.

17. The system of claim 16, wherein the no-dispatch information is selected from a finite set of values.

18. The system of claim 15, wherein one or more instructions contain supplemental no-dispatch information, the dispatch unit able to discard the one or more instructions containing the supplemental no-dispatch information.

19. The system of claim 15, the set of instructions including actual instructions and no-dispatch instructions, the system able to process the actual instructions and the no-dispatch instructions concurrently.

* * * * *